United States Patent
Langkabel et al.

(10) Patent No.: US 10,221,277 B2
(45) Date of Patent: Mar. 5, 2019

(54) EPOXY RESIN COMPOSITION COMPRISING 2-(3-(AMINOMETHYL)-3,5,5-TRIMETHYLCYCLOHEXYL)PROPANE-1,3-DIAMINE (AM-CPDA) AS HARDENER

(71) Applicant: Evonik Degussa GmbH, Essen (DE)

(72) Inventors: Eike Langkabel, Wegberg (DE); Martina Ortelt, Flein (DE); Dirk Fuchsmann, Haltern am See (DE); Jaclyn Balthasar, Glinde (DE); Alexander Martin Rüfer, Recklinghausen (DE); Anne Rittsteiger, Olfen (DE); Jörg-Joachim Nitz, Essen (DE); Stephan Kohlstruk, Gladbeck (DE)

(73) Assignee: Evonik Degussa GmbH, Essen (DE)

( * ) Notice: Subject to any disclaimer, the term of this patent is extended or adjusted under 35 U.S.C. 154(b) by 171 days.

(21) Appl. No.: 15/602,723

(22) Filed: May 23, 2017

(65) Prior Publication Data

US 2017/0355809 A1    Dec. 14, 2017

(30) Foreign Application Priority Data

Jun. 10, 2016  (EP) .................................... 16173863

(51) Int. Cl.
*C08G 59/50*      (2006.01)
*C08G 59/06*      (2006.01)
*C08L 63/00*      (2006.01)

(52) U.S. Cl.
CPC ........ *C08G 59/5026* (2013.01); *C08G 59/063* (2013.01); *C08L 63/00* (2013.01)

(58) Field of Classification Search
None
See application file for complete search history.

(56) References Cited

U.S. PATENT DOCUMENTS

| | | |
|---|---|---|
| 3,030,247 A | 4/1962 | Schurb |
| 3,386,955 A | 6/1968 | Chrobok et al. |
| 3,609,121 A | 9/1971 | Lohse et al. |
| 3,677,978 A | 7/1972 | Dowbenko |
| 3,678,007 A | 7/1972 | Dowbenko |
| 4,283,520 A | 8/1981 | Moser et al. |
| 4,436,892 A | 3/1984 | Zondler et al. |
| 4,529,821 A | 7/1985 | Stockinger et al. |
| 4,550,203 A | 10/1985 | Stockinger et al. |
| 4,587,311 A | 5/1986 | Schmid et al. |
| 4,618,712 A | 10/1986 | Stockinger et al. |
| 4,694,096 A | 9/1987 | Lehmann et al. |
| 5,274,054 A | 12/1993 | Moser et al. |
| 6,613,861 B2 | 9/2003 | Gras |
| 6,908,980 B2 | 6/2005 | Gras |
| 6,916,897 B2 | 7/2005 | Gras |
| 6,924,385 B2 | 8/2005 | Lettmann et al. |
| 9,085,506 B2 | 7/2015 | Galle et al. |
| 2008/0027169 A1 | 1/2008 | Ortelt |
| 2008/0045738 A1 | 2/2008 | Orschel et al. |
| 2012/0328811 A1* | 12/2012 | Patel ................ C09D 4/00 428/36.9 |
| 2013/0041103 A1 | 2/2013 | Grenda et al. |
| 2014/0213697 A1 | 7/2014 | Kaffee et al. |
| 2016/0289164 A1 | 10/2016 | Kohlstruk et al. |

FOREIGN PATENT DOCUMENTS

| | | |
|---|---|---|
| CA | 2145589 A1 | 9/1995 |
| DE | 102011113395 A1 | 3/2013 |
| EP | 0507735 A2 | 10/1992 |
| EP | 669353 A1 | 8/1995 |
| EP | 675185 A2 | 10/1995 |
| KR | 20160112716 A * | 9/2016 |
| WO | 9955772 A1 | 11/1999 |
| WO | 2005087705 A1 | 9/2005 |
| WO | 2005111135 A1 | 11/2005 |
| WO | 2016120235 A1 | 8/2016 |

OTHER PUBLICATIONS

European Search Report dated Dec. 14, 2016 in EP 16 17 3863 (1 page).
Langkabel et al., U.S. Appl. No. 15/603,966, filed May 24, 2017.
Langkabel et al., U.S. Appl. No. 15/604,118, filed May 24, 2017.
Rittsteiger et al., U.S. Appl. No. 15/473,892, filed Mar. 30, 2017.
Rüfer et al., U.S. Appl. No. 15/604,873, filed May 25, 2017.
Rüfer et al., U.S. Appl. No. 15/604,988, filed May 25, 2017.
Rüfer et al., U.S. Appl. No. 15/605,268, filed May 25, 2017.

* cited by examiner

*Primary Examiner* — Randy P Gulakowski
*Assistant Examiner* — Ha S Nguyen
(74) *Attorney, Agent, or Firm* — Philip P. McCann; Nexsen Pruet PLLC

(57) ABSTRACT

An epoxy resin composition including A) at least one epoxy compound and B) a hardener composition including B1) 0.1%-100% by weight of 2-(3-(aminomethyl)-3,5,5-trimethylcyclohexyl)propane-1,3-diamine, and B2) 99.9%-0% by weight of at least one further diamine and/or polyamine, where the stoichiometric ratio of the epoxy groups of A) and the number of active hydrogen atoms of the functional groups of B) varies from 1:2 to 2:1.

19 Claims, No Drawings

EPOXY RESIN COMPOSITION COMPRISING 2-(3-(AMINOMETHYL)-3,5,5-TRIMETHYLCYCLOHEXYL)PROPANE-1,3-DIAMINE (AM-CPDA) AS HARDENER

This application claims the benefit of European Application No. 16173863.8 filed on Jun. 10, 2016, the disclosure of which is expressly incorporated herein by reference.

BACKGROUND

The invention provides an epoxy resin composition comprising 2-(3-(aminomethyl)-3,5,5-trimethylcyclohexyl)propane-1,3-diamine (AM-CPDA) as hardener.

Epoxy compositions consisting of at least one epoxy resin and at least one hardener, for example amines, anhydrides or dicyandiamide, have long been known and are used in fields of application such as coatings, composites or flooring, for example.

The invention provides epoxy compositions consisting of at least one resin component and at least one hardener component, the composition being suitable as a thermoset matrix, for example for production of semifinished fiber matrix products and cured fiber matrix mouldings or laminates, called composites.

In the context of increasing demands for efficient utilization of scarce resources, lightweight construction solutions are gaining increased attention in a wide variety of different industries. Whenever masses have to be moved, fiber composite materials/composites are an option of interest, since these offer high specific stiffnesses and strengths coupled with low weight. For this reason, composites have been established in aviation for decades, and without fiber composite material technologies even rotor blades for wind turbines, for example, would not be conceivable. Because of their excellent profile of properties, these materials are also gaining increasing attention in automobile construction. In all 3 market segments mentioned, components of high mechanical strength are required, as achievable by means of continuous fiber-reinforced polymer materials. However, the geometries of these components are becoming ever more demanding (for example, the length of the rotor blades of wind turbines is constantly increasing in order to be able to "harvest" a maximum amount of wind energy), with a simultaneous demand for ever higher productivity (for example short cycle times, particularly in automobile manufacture).

SUMMARY

The epoxy resin composition of the invention, in the field of composites, is especially suitable for liquid impregnation methods. One example of such a liquid impregnation method is the RTM method. This method is characterized in that what are called near net shape preforms are first produced from sheetlike textile structures. This involves preforming non-resin-impregnated fiber products (i.e. woven fabrics, laid scrims, nonwoven fabrics, etc. as supplied) to three-dimensional structures in near net shape form and at the same time bonding the individual laminas for fixing, or sewing them in the case of particularly complex parts. This pure fiber preform is then introduced into a cavity and, in the closed cavity, for example a heated steel mould, impregnated with a solvent-free liquid resin formulation and, in the closed cavity, cured through immediately to give the final state (one-stage method). Further methods for production of fiber composite materials that proceed from liquid solvent-free impregnation mixtures are pultrusion (strand drawing methods) for production of profiles of any kind and the filament winding method for production of pipes or pressure vessels, for example gas tanks. In this context, composites are understood to mean composite materials composed of fibers and polymer matrix.

DETAILED DESCRIPTION

In the context of this invention, the term "composites" is particularly used synonymously with the terms "composite components", "composite material", "fiber composite material", "composite mouldings", "fiber-reinforced plastics" or "fiber-reinforced components", "CFK", "GFK" and "FVK". Prepregs and SMC (sheet moulding compounds) are representative of typical semifinished fiber matrix products for production of composites.

In addition, the curable compositions can be used for coatings, especially coatings on metal, mineral substrates and plastics, and for floor coverings, for polymer concrete, repair systems and anchoring materials, and additionally for adhesives, potting compounds, domed labels and paints, especially in corrosion protection.

As is apparent, the fields of use for epoxy resin formulations and hence the demands on these formulations are extremely varied.

It was therefore an object of the present invention to find novel epoxy resin compositions based on novel hardeners, which can be formulated in an extremely flexible manner in order to take account of a maximum number of demands. These demands include high reactivity, rheological characteristics that can be adjusted within broad limits, high glass transition temperature, good mechanical properties, good media resistance, low shrinkage and low tendency to yellow.

The invention provides an epoxy resin composition comprising:
A) at least one epoxy compound
and
B) a hardener composition comprising:
  B1) 0.1%-100% by weight of 2-(3-(aminomethyl)-3,5,5-trimethylcyclohexyl)propane-1,3-diamine,
  and
  B2) 99.9%-0% by weight of at least one further diamine and/or polyamine,
where the stoichiometric ratio of the epoxy groups of A) and the number of active hydrogen atoms of the functional groups of B) varies from 1:2 to 2:1, preferably from 1:1.5 to 1.5:1 and more preferably from 1:1.25 to 1.25:1,
C) optionally 0.1% to 10% by weight of at least one hardening accelerator,
D) optionally at least one latent hardener,
where the amounts of A)-D) add up to 100% by weight,
E) optionally further additives.

Preferably, the invention provides an epoxy resin composition consisting of:
A) at least one epoxy compound
and
B) a hardener composition comprising:
  B1) 0.1%-100% by weight of 2-(3-(aminomethyl)-3,5,5-trimethylcyclohexyl)propane-1,3-diamine,
  and
  B2) 99.9%-0% by weight of at least one further diamine and/or polyamine,
where the stoichiometric ratio of the epoxy groups of A) and the number of hydrogen atoms of the functional groups of B) varies from 1:2 to 2:1, preferably from 1:1.5 to 1.5:1 and more preferably from 1:1.25 to 1.25:1, C) optionally 0.1% to 10% by weight of at least one hardening accelerator,
D) optionally at least one latent hardener,
where the amounts of A)-D) add up to 100% by weight,
E) optionally further additives.

Resins

Component A)

Suitable components A) are epoxy compounds. Suitable epoxy compounds are described, for example, in EP 675 185.

Useful compounds are a multitude of those known for this purpose that contain more than one epoxy group, preferably two epoxy groups, per molecule. These epoxy compounds may either be saturated or unsaturated and be aliphatic, cycloaliphatic, aromatic or heterocyclic, and also have hydroxyl groups. They may additionally contain such substituents that do not cause any troublesome side reactions under the mixing or reaction conditions, for example alkyl or aryl substituents, ether moieties and the like. They are preferably glycidyl ethers which derive from polyhydric phenols, especially bisphenols and novolacs, and which have molar masses based on the number of epoxy groups ME ("epoxy equivalent weights", "EV value") between 100 and 1500, but especially between 150 and 250, g/eq.

Examples of polyhydric phenols include: resorcinol, hydroquinone, 2,2-bis(4-hydroxyphenyl)propane (bisphenol A), isomer mixtures of dihydroxydiphenylmethane (bisphenol F), 4,4'-dihydroxydiphenylcyclohexane, 4,4'-dihydroxy-3, 3'-dimethyldiphenylpropane, 4,4'-dihydroxydiphenyl, 4,4'-dihydroxybenzophenone, bis(4-hydroxyphenyl)-1,1-ethane, bis(4-hydroxyphenyl)-1,1-isobutane, 2,2-bis(4-hydroxy-tert-butylphenyl)propane, bis(2-hydroxynaphthyl)methane, 1,5-dihydroxynaphthalene, tris(4-hydroxyphenyl)methane, bis(4-hydroxyphenyl) ether, bis(4-hydroxyphenyl) sulphone inter alia, and the chlorination and bromination products of the aforementioned compounds, for example tetrabromobisphenol A. Very particular preference is given to using liquid diglycidyl ethers based on bisphenol A and bisphenol F having an epoxy equivalent weight of 150 to 200 g/eq. It is also possible to use polyglycidyl ethers of polyalcohols, for example ethane-1,2-diol diglycidyl ether, propane-1,2-diol diglycidyl ether, propane-1,3-diol diglycidyl ether, butanediol diglycidyl ether, pentanediol diglycidyl ether (including neopentyl glycol diglycidyl ether), hexanediol diglycidyl ether, diethylene glycol diglycidyl ether, dipropylene glycol diglycidyl ether, higher polyoxyalkylene glycol diglycidyl ethers, for example higher polyoxyethylene glycol diglycidyl ethers and polyoxypropylene glycol diglycidyl ethers, co-polyoxyethylene-propylene glycol diglycidyl ethers, polyoxytetramethylene glycol diglycidyl ethers, polyglycidyl ethers of glycerol, of hexane-1,2,6-triol, of trimethylolpropane, of trimethylolethane, of pentaerythritol or of sorbitol, polyglycidyl ethers of oxyalkylated polyols (for example of glycerol, trimethylolpropane, pentaerythritol, inter alia), diglycidyl ethers of cyclohexanedimethanol, of bis(4-hydroxycyclohexyl)methane and of 2,2-bis(4-hydroxycyclohexyl)propane, polyglycidyl ethers of castor oil, triglycidyl tris(2-hydroxyethyl)isocyanurate.

Further useful components A) include: poly(N-glycidyl) compounds obtainable by dehydrohalogenation of the reaction products of epichlorohydrin and amines such as aniline, n-butylamine, bis(4-aminophenyl)methane, m-xylylenediamine or bis(4-methylaminophenyl)methane. The poly(N-glycidyl) compounds also include triglycidyl isocyanurate, triglycidylurazole and oligomers thereof, N,N'-diglycidyl derivatives of cycloalkyleneureas and diglycidyl derivatives of hydantoins inter alia.

In addition, it is also possible to use polyglycidyl esters of polycarboxylic acids which are obtained by the reaction of epichlorohydrin or similar epoxy compounds with an aliphatic, cycloaliphatic or aromatic polycarboxylic acid such as oxalic acid, succinic acid, adipic acid, glutaric acid, phthalic acid, terephthalic acid, tetrahydrophthalic acid, hexahydrophthalic acid, naphthalene-2,6-dicarboxylic acid and higher diglycidyl dicarboxylates, for example dimerized or trimerized linolenic acid. Examples are diglycidyl adipate, diglycidyl phthalate and diglycidyl hexahydrophthalate.

Mention should additionally be made of glycidyl esters of unsaturated carboxylic acids and epoxidized esters of unsaturated alcohols or unsaturated carboxylic acids. In addition to the polyglycidyl ethers, it is possible to use small amounts of monoepoxides, for example methyl glycidyl ether, butyl glycidyl ether, allyl glycidyl ether, ethylhexyl glycidyl ether, long-chain aliphatic glycidyl ethers, for example cetyl glycidyl ether and stearyl glycidyl ether, monoglycidyl ethers of a higher isomeric alcohol mixture, glycidyl ethers of a mixture of C12 to C13 alcohols, phenyl glycidyl ether, cresyl glycidyl ether, p-tert-butylphenyl glycidyl ether, p-octylphenyl glycidyl ether, p-phenylphenyl glycidyl ether, glycidyl ethers of an alkoxylated lauryl alcohol, and also monoepoxides such as epoxidized mono-unsaturated hydrocarbons (butylene oxide, cyclohexene oxide, styrene oxide), in proportions by mass of up to 30% by weight, preferably 10% to 20% by weight, based on the mass of the polyglycidyl ethers. A detailed enumeration of the suitable epoxy compounds can be found in the handbook "Epoxidverbindungen and Epoxidharze" [Epoxy Compounds and Epoxy Resins] by A. M. Paquin, Springer Verlag, Berlin 1958, Chapter IV, and in Lee Neville "Handbook of Epoxy Resins", 1967, Chapter 2.

Useful epoxy compounds preferably include glycidyl ethers and glycidyl esters, aliphatic epoxides, diglycidyl ethers based on bisphenol A and/or bisphenol F, and glycidyl methacrylates. Other examples of such epoxides are triglycidyl isocyanurate (TGIC, trade name: ARALDIT 810, Huntsman), mixtures of diglycidyl terephthalate and triglycidyl trimellitate (trade name: ARALDIT PT 910 and 912, Huntsman), glycidyl esters of Versatic acid (trade name: CARDURA E10, Shell), 3,4-epoxycyclohexylmethyl 3',4'-epoxycyclohexanecarboxylate (ECC), ethylhexyl glycidyl ether, butyl glycidyl ether, pentaerythrityl tetraglycidyl ether (trade name: POLYPDX R 16, UPPC AG), and other Polypox products having free epoxy groups. It is also possible to use mixtures of the epoxy compounds mentioned.

Particularly preferred epoxy components are polyepoxides based on bisphenol A diglycidyl ether, bisphenol F diglycidyl ether, 4,4'-methylenebis[N,N-bis(2,3-epoxypropyl)aniline], hexanediol diglycidyl ether, butanediol diglycidyl ether, trimethylolpropane triglycidyl ether, propane-1, 2,3-triol triglycidyl ether, pentaerythritol tetraglycidyl ether and diglycidyl hexahydrophthalate.

According to the invention, it is also possible with preference to use mixtures of these epoxy compounds as component A).

The amount of component A) is guided by the composition of component B) and is calculated such that the stoichiometric ratio of the epoxy groups of A) and the number of hydrogen atoms of the functional groups of B) varies from 1:2 to 2:1, preferably from 1:1.5 to 1.5:1 and more preferably from 1:1.25 to 1.25:1.

This means that one epoxy group from A) reacts per hydrogen atom in the amino groups from B).

According to the invention, component B1) used is 2-(3-(aminomethyl)-3,5,5-trimethylcyclohexyl)propane-1,3-diamine (AM-CPDA).

2-(3-(Aminomethyl)-3,5,5-trimethylcyclohexyl)propane-1,3-diamine (AM-CPDA), called AM-CPDA hereinafter, has the chemical structure as shown in formula 1.

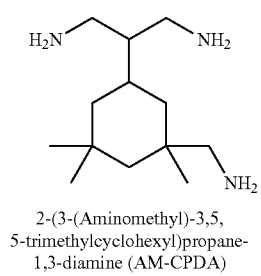

Formula 1

2-(3-(Aminomethyl)-3,5,5-trimethylcyclohexyl)propane-1,3-diamine (AM-CPDA)

Suitable compounds B2) are in principle those diamines and polyamines containing at least 2 amino groups. Diamines and polyamines can also be used in mixtures with latent amines, amino alcohols or polymercaptans.

Di- or polyamines B2) are known in the literature. These may be monomeric, oligomeric and/or polymeric compounds. Monomeric and oligomeric compounds are preferably selected from the group of diamines, triamines, tetramines. The amine group of the di- or polyamines B2) may be attached to a primary, secondary or tertiary carbon atom, preferably to a primary or secondary carbon atom. It is also possible to use mixtures of di- and/or polyamines as component B2).

Components B2) used may be the following amines, alone or in mixtures:
  aliphatic amines, such as the polyalkylenepolyamines, preferably selected from ethylene-1,2-diamine, propylene-1,2-diamine, propylene-1,3-diamine, butylene-1,2-diamine, butylene-1,3-diamine, butylene-1,4-diamine, 2-(ethylamino)ethylamine, 3-(methylamino)propylamine, diethylenetriamine, triethylenetetramine, pentaethylenehexamine, trimethylhexamethylenediamine, 2,2,4-trimethylhexamethylenediamine, 2,4,4-trimethylhexamethylenediamine, 2-methylpentanediamine, hexamethylenediamine, N-(2-aminoethyl)ethane-1,2-diamine, N-(3-aminopropyl)propane-1,3-diamine, N,N"-1,2-ethanediylbis(1,3-propanediamine), dipropylenetriamine, adipic dihydrazide, hydrazine;
  oxyalkylenepolyamines selected from polyoxypropylenediamine and polyoxypropylenetriamine (e.g. Jeffamine® D-230, Jeffamine® D-400, Jeffamine® T-403, Jeffamine® T-5000), 1,13-diamino-4,7,10-trioxatridecane, 4,7-dioxadecane-1,10-diamine;
  cycloaliphatic amines selected from isophoronediamine (3,5,5-trimethyl-3-aminomethylcyclohexylamine), 4,4'-diaminodicyclohexylmethane, 2,4'-diaminodicyclohexylmethane and 2,2'-diaminodicyclohexylmethane, alone or in mixtures of the isomers, 3,3'-dimethyl-4,4'-diaminodicyclohexylmethane, N-cyclohexyl-1,3-propanediamine, 1,2-diaminocyclohexane, 3-(cyclohexylamino)propylamine, piperazine, N-aminoethylpiperazine, TCD diamine (3(4),8(9)-bis(aminomethyl)tricyclo[5.2.1.0$^{2,6}$]decane), 4-methylcyclohexane-1,3-diamine
  araliphatic amines such as xylylenediamines;
  aromatic amines selected from phenylenediamines, phenylene-1,3-diamine, phenylene-1,4-diamine, 4,4'-diaminodiphenylmethane, 2,4'-diaminodiphenylmethane, 2,2'-diaminodiphenylmethane, alone or in mixtures of the isomers;
  adduct hardeners which are the reaction products of epoxy compounds, especially glycidyl ethers of bisphenol A and F, with excess amine;
  polyamidoamine hardeners which are obtained by condensation of mono- and polycarboxylic acids with polyamines, especially by condensation of dimer fatty acids with polyalkylenepolyamines;
  Mannich base hardeners which are obtained by reaction of mono- or polyhydric phenols with aldehydes, especially formaldehyde, and polyamines;
  Mannich bases, for example based on phenol and/or resorcinol, formaldehyde and m-xylylenediamine, and also N-aminoethylpiperazine and blends of N-aminoethylpiperazine with nonylphenol and/or benzyl alcohol, phenalkamines which are obtained in a Mannich reaction from cardanols, aldehydes and amines.

It is also possible to use mixtures of the aforementioned di- or polyamines as component B2).

Preference is given to using diamines as component B2), selected from isophoronediamine (3,5,5-trimethyl-3-aminomethylcyclohexylamine, IPD), 4,4'-diaminodicyclohexylmethane, 2,4'-diaminodicyclohexylmethane, 2,2'-diaminodicyclohexylmethane (also referred to as PACM), alone or in mixtures of the isomers, a mixture of the isomers of 2,2,4-trimethylhexamethylenediamine and 2,4,4-trimethylhexamethylenediamine (TMD), adduct hardeners based on the reaction products of epoxy compounds and the aforementioned amines B2) or combination of the aforementioned amines B2). It is also possible to use mixtures of these compounds.

In addition, components B2) used may preferably be the following amines based on triacetonediamine: 2,2,6,6-tetramethyl-4-aminopiperidine (TAD), hexamethylenebis(4-amino-2,2,6,6-tetramethylpiperidine), N-butyl-4-amino-2,2,6,6-tetramethylpiperidine, N,N-dimethylaminopropyl-4-amino-2,2,6,6-tetramethylpiperidine, N-propyl-4-amino-2,2,6,6-tetramethylpiperidine, N-isopropyl-4-amino-2,2,6,6-tetramethylpiperidine, N-hydroxyethyl-4-amino-2,2,6,6-tetramethylpiperidine, N-methoxyethyl-4-amino-2,2,6,6-tetramethylpiperidine, N-methoxyethyl-4-amino-2,2,6,6-tetramethylpiperidine, N',N'-dimethylaminoethyl-4-amino-2,2,6,6-tetramethylpiperidine, N-morpholinoethyl-4-amino-2,2,6,6-tetramethylpiperidine, N-piperazinoethyl-4-amino-2,2,6,6-tetramethylpiperidine, 4-morpholino-2,2,6,6-tetramethylpiperidine.

It is also possible to use mixtures of the aforementioned amines based on triacetonediamine. Preference is given to using 2,2,6,6-tetramethyl-4-aminopiperidine (TAD) and/or hexamethylenebis(4-amino-2,2,6,6-tetramethylpiperidine).

Very particular preference is given to using, as component B2),
  a) isophoronediamine (3,5,5-trimethyl-3-aminomethylcyclohexylamine, IPD),
  b) or a combination of
    1. isophoronediamine and
    2. a mixture of the isomers of 2,2,4-trimethylhexamethylenediamine and 2,4,4-trimethylhexamethylenediamine (TMD), alone or in mixtures of the isomers,
    3. and/or a mixture of the isomers of 4,4'-diaminodicyclohexylmethane, 2,4'-diaminodicyclohexylmethane and 2,2'-diaminodicyclohexylmethane (also referred to as PACM), alone or in mixtures of the isomers,
c) or a combination of
1. a mixture of the isomers of 2,2,4-trimethylhexamethylenediamine and 2,4,4-trimethylhexamethylenediamine (TMD), alone or in mixtures of the isomers,
2. and/or a mixture of the isomers of 4,4'-diaminodicyclohexylmethane, 2,4'-diaminodicyclohexylmethane and 2,2'-diaminodicyclohexylmethane (also referred to as PACM), alone or in mixtures of the isomers,
d) and/or adduct hardeners based on the reaction products of epoxy compounds and the aforementioned amines B2) or combination of the aforementioned amines B2).

According to the invention, amino alcohols can be used as a further component to the diamines and polyamines in mixtures in component B2). Examples of amino alcohols include monoethanolamine, 3-amino-1-propanol, isopropanolamine, aminoethoxyethanol, N-(2-aminoethyl)ethanolamine, N-ethyl ethanolamine, N-butylethanolamine, diethanolamine, 3-(hydroxyethylamino)-1-propanol, isophorone amino alcohol and diisopropanolamine. Amino alcohols can be used alone or as mixtures of two or more amino alcohols together with di- or polyamines as component B2).

The amount of component B1) used is generally 0.1%-100% by weight, preferably 20%-80% by weight, based on the total amount of B1) and B2).

Component C) Hardening Accelerators

In addition, hardening accelerators are present as component C) and are added as catalysts for the epoxy-amine reaction. Suitable accelerators are described in: H. Lee and K. Neville, *Handbook of Epoxy Resins*, McGraw-Hill, New York, 1967. According to the invention, 0.1% to 10% by weight, preferably 0.1% to 5% by weight, more preferably 0.5% to 2.0% by weight, based on the total amount of the components, of at least one hardening accelerator is used.

Examples of suitable accelerators are organic acids such as salicylic acid, dihydroxybenzoic acid, trihydroxybenzoic acid, methyl salicylic acid, 2-hydroxy-3-isopropylbenzoic acid or hydroxynaphthoic acids, lactic acid and glycolic acid, tertiary amines such as benzyldimethylamine (BDMA), 1,4-diazabicyclo[2.2.2]octane (DABCO), triethylamine, N,N'-dimethylpiperazine or aminoethylpiperazine (AEP), hydroxylamines such as dimethylaminomethylphenol, bis(dimethylaminomethyl)phenol, 2,4,6-tris(dimethylaminomethyl)phenol (Ancamine K54), urons such as 3-(4-chlorophenyl)-1,1-dimethylurea (monuron), 3-(3,4-dichlorophenyl)-1,1-dimethylurea (diuron), 3-phenyl-1,1-dimethylurea (fenuron), 3-(3-chloro-4-methylphenyl)-1,1-dimethylurea (chlortoluron), tetraalkylguanidines such as N,N,N',N'-tetramethylguanidine (TMG), imidazole and imidazole derivatives such as 1H-imidazole, 1-methylimidazole, 2-methylimidazole, 1-benzyl-2-methylimidazole, 2-ethyl-4-methylimidazole, 2-phenylimidazole, 2-phenyl-4-methylimidazole, 1-vinylimidazole, 1-(2-hydroxyethyl)imidazole, 1,2-dimethylimidazole, 1-cyanoethylimidazole and the suitable salts thereof, phenol and phenol derivatives such as t-butylphenol, nonylphenol, bisphenol A or bisphenol F, and organic or inorganic salts and complexes such as methyltriphenylphosphonium bromide, calcium nitrate (Accelerator 3130), or carboxylates, sulphonates, phosphonates, sulphates, tetrafluoroborates or nitrates of Mg, Ca, Zn and Sn. Particular preference is given to imidazole and imidazole derivatives.

Component D)

In addition to component B2), it is possible to use latent hardeners as component D). An additional latent hardener used may in principle be any compound known for this purpose, i.e. any compound which is inert toward the epoxy resins below the defined limiting temperature of 80° C. but reacts rapidly with crosslinking of the resin as soon as this limiting temperature has been exceeded. The limiting temperature for the latent hardeners used is preferably at least 85° C., especially at least 100° C. Compounds of this kind are well known and also commercially available. In principle, it is possible to use latent hardeners selected from dicyandiamide, cyanoguanidines, aromatic amines, guanidines, modified polyamines, N-acylimidazoles, imidazoles, carbonyl hydrazides, triazine derivatives, melamine and derivatives thereof, N-cyanoacylamide compounds, acylthiopropylphenols.

Examples of suitable latent hardeners are dicyandiamide, cyanoguanidines, for example the compounds described in U.S. Pat. No. 4,859,761 or EP-A-306 451, aromatic amines, for example 4,4'- or 3,3'-diaminodiphenyl sulphone, or guanidines, for example 1-o-tolylbiguanide, or modified polyamines, for example Ancamine TM 2014 S (Anchor Chemical UK Limited, Manchester).

Suitable latent hardeners are also N-acylimidazoles, for example 1-(2,4,6-trimethylbenzoyl)-2-phenylimidazole or 1-benzoyl-2-isopropylimidazole. Such compounds are described, for example, in U.S. Pat. Nos. 4,436,892, 4,587, 311 or JP Patent 743,212.

Further suitable hardeners are metal salt complexes of imidazoles, as described, for example, in U.S. Pat. Nos. 3,678,007 or 3,677,978, carbonyl hydrazides, for example adipic dihydrazide, isophthalic dihydrazide or anthranilic hydrazide, triazine derivatives, for example 2-phenyl-4,6-diamino-s-triazine (benzoguanamine) or 2-lauryl-4,6-diamino-s-triazine (lauroguanamine), and melamine and derivatives thereof. The latter compounds are described, for example, in U.S. Pat. No. 3,030,247. Other suitable latent hardeners are cyanoacetyl compounds, as described, for example, in U.S. Pat. No. 4,283,520, for example neopentyl glycol bis(cyanoacetate), N-isobutylcyanoacetamide, hexamethylene 1,6-bis(cyanoacetate) or cyclohexane-1,4-dimethanol bis(cyanoacetate). Suitable latent hardeners are also N-cyanoacylamide compounds, for example N,N'-dicyanoadipamide. Such compounds are described, for example, in U.S. Pat. Nos. 4,529,821, 4,550,203 and 4,618,712.

Further suitable latent hardeners are the acylthiopropylphenols described in U.S. Pat. No. 4,694,096 and the urea derivatives disclosed in U.S. Pat. No. 3,386,955, for example toluene-2,4-bis(N,N-dimethylcarbamide).

Preferred latent hardeners are 4,4'-diaminodiphenyl sulphone and dicyandiamide.

Component D) can be used in amounts of 1%-30% by weight, preferably 3%-25% by weight, and more preferably in amounts of 5%-20% by weight, based on the sum total of components B1), B2) and D).

If a latent hardener is being used in addition to component B2), component A) is chosen in such amounts that the ratio of the epoxy groups of A) and the number of hydrogen atoms of the functional groups of B) and D) varies from 1:2 to 2:1, preferably from 1:1.5 to 1.5:1 and more preferably from 1:1.25 to 1.25:1.

Component E) Additives

The composition of the invention may optionally comprise additives. Additives are understood to mean substances which are generally added in order to alter the properties of the epoxy composition in the desired direction, for example to match viscosity, wetting characteristics, stability, reaction rate, blister formation, storability or adhesion, and also use properties, to the end use. Suitable additives are described, for example, in WO 99/55772, p. 15-25, and in "Plastics Additives, R. Gächter and H. Müller, Hanser Publishers 1983". These can be added to component A) or B).

For example, it is possible to add light stabilizers, for example sterically hindered amines, or other auxiliaries as described, for example, in EP 669 353 in a total amount of 0.05% to 5% by weight.

For the production of the reactive compositions of the invention, it is additionally possible to add additives such as levelling agents, for example polysilicones, or adhesion promoters, for example those based on acrylate. In addition, still further components may optionally be present. Auxiliaries and additives used in addition may be chain transfer agents, plasticizers, stabilizers and/or inhibitors.

In addition, it is possible to add dyes, nanoscale fillers, tougheners (toughness improvers), mould release agents, flame retardants, pigments, desiccants, wetting, dispersing and levelling auxiliaries, adhesion promoters, UV stabilizers, defoamers and rheology additives.

The invention also provides for the use of epoxy resin compositions comprising:
A) at least one epoxy compound
and
B) a hardener composition comprising:
  B1) 0.1%-100% by weight of 2-(3-(aminomethyl)-3,5,5-trimethylcyclohexyl)propane-1,3-diamine,
  and
  B2) 99.9%-0% by weight of at least one further diamine and/or polyamine,
where the stoichiometric ratio of the epoxy groups of A) and the number of hydrogen atoms of the functional groups of B) varies from 1:2 to 2:1, preferably from 1:1.5 to 1.5:1 and more preferably from 1:1.25 to 1.25:1,
C) optionally 0.1% to 10% by weight of at least one hardening accelerator,
D) optionally at least one latent hardener,
where the amounts of A)-D) add up to 100% by weight,
E) optionally further additives,
for production of composites.

The fibrous carrier material for the composites which is used with preference in accordance with the invention is characterized in that the fibrous carriers consist for the most part of glass, carbon, polymers such as polyamide (aramid) or polyesters, natural fibers, or mineral fiber materials such as basalt fibers or ceramic fibers, individually or of mixtures, or of multiple plies of various fiber types.

The fibrous carriers take the form of sheetlike textile structures made from nonwoven fabric, of knitted fabric including loop-formed and loop-drawn knits, of non-knitted structures such as woven fabrics, laid scrims or braids, or of long-fiber or short-fiber materials, individually or of multiple plies of various types.

The detailed execution is as follows: The fibrous carrier in the present invention consists of fibrous material (also often called reinforcing fibers). Any material that the fibers consist of is generally suitable, but preference is given to using fibrous material made of glass, carbon, plastics such as polyamide (aramid) or polyester, natural fibers, or mineral fiber materials such as basalt fibers or ceramic fibers (oxidic fibers based on aluminium oxides and/or silicon oxides). It is also possible to use mixtures of fiber types, for example woven fabric combinations of aramid and glass fibers, or carbon and glass fibers. Hybrid composite parts comprising prepregs composed of different fibrous carriers are likewise suitable.

Mainly because of their relatively low cost, glass fibers are the most commonly used fiber types. In principle, all types of glass-based reinforcing fibers are suitable here (E glass, S glass, R glass, M glass, C glass, ECR glass, D glass, AR glass, or hollow glass fibers).

Carbon fibers are generally used in high-performance composites, where another important factor is the lower density compared to glass fibers with simultaneously high strength. Carbon fibers are industrially produced fibers composed of carbonaceous starting materials which are converted by pyrolysis to carbon in a graphite-like arrangement. A distinction is made between isotropic and anisotropic types: isotropic fibers have only low strengths and lower industrial significance; anisotropic fibers exhibit high strengths and rigidities with simultaneously low elongation at break. Natural fibers refer here to all textile fibers and fibrous materials which are obtained from plant and animal material (for example wood fibers, cellulose fibers, cotton fibers, hemp fibers, jute fibers, flax fibers, sisal fibers and bamboo fibers). Similarly to carbon fibers, aramid fibers exhibit a negative coefficient of thermal expansion, i.e. become shorter on heating. Their specific strength and their modulus of elasticity are markedly lower than those of carbon fibers. In combination with the positive coefficient of expansion of the matrix resin, it is possible to produce components of high dimensional stability. Compared to carbon fiber-reinforced plastics, the compressive strength of aramid fiber composites is much lower. Known brand names for aramid fibers are Nomex® and Kevlar® from DuPont, or Teijinconex®, Twaron® and Technora® from Teijin. Particularly suitable and preferred carriers are those made of glass fibers, carbon fibers, aramid fibers or ceramic fibers. The fibrous material is a sheetlike textile structure. Suitable materials are sheetlike textile structures made from nonwoven fabric, and likewise knitted fabric including loop-formed and loop-drawn knits, but also non-knitted fabrics such as woven fabrics, laid scrims or braids. In addition, a distinction is made between long-fiber and short-fiber materials as carriers. Likewise suitable in accordance with the invention are rovings and yarns. In the context of the invention, all the materials mentioned are suitable as fibrous carriers. An overview of reinforcing fibers is contained in "Composites Technologies", Paolo Ermanni (Version 4), script for lecture at ETH Zürich, August 2007, Chapter 7.

EXAMPLES

Example 2-(3-(Aminomethyl)-3,5,5-trimethylcyclohexyl)propane-1,3-diamine (AM-CPDA) as Hardener in Epoxy Resin Systems The epoxy resin employed was the standard resin Epikote 828 from Hexion having an epoxy equivalent weight of 188 g/eq. The latter was blended as specified with the hardener component 2-(3-(aminomethyl)-3,5,5-trimethylcyclohexyl) propane-1,3-diamine (AM-CPDA) or isophoronediamine (IPD), and the glass transition temperature was determined after a delay time of one hour at a defined hardening temperature. For this purpose, 5 g in each case of formulation were hardened under the conditions specified in an aluminium pan of diameter 5 cm to give a pure resin casting having a thickness of 2 mm. The respective reaction conversions were determined via the recorded evolution of heat from the hardening reaction in relation to the maximum evolution of heat.

Description of the Analysis Methods:
DSC
Glass Transition Temperature:
Instrument: Mettler DSC 1
Parameters: Temperature −30 to +250° C., heating rate 10 K/min
Determination of glass transition temperature (Tg):
Half step-height method, midpoint DIN 51007
Determination of Conversion:

$$100 - \left(\frac{\text{exothermic heat flux after hardening} \times 100}{\text{exothermic heat flux before hardening}}\right)$$

| Example | | 1 | Comparative example |
|---|---|---|---|
| A) Amount of epoxy resin (g) per 100 g of hardener | | 492 | 441 |
| B) Hardener component AM-CPDA (g) | | 100 | |
| C) Hardener component IPD | | | 100 |
| Epoxy groups from A):amino hydrogens from B) | | 1:1 | 1:1 |
| DSC analysis after hardening at 50° C. for 1 h | | | |
| Tg | ° C. | 47 | 38 |
| Conversion | % | 56 | 59 |
| DSC analysis after hardening at 70° C. for 1 h | | | |
| Tg | ° C. | 84 | 77 |
| Conversion | % | 71 | 82 |
| DSC analysis after hardening at 90° C. for 1 h | | | |
| Tg | ° C. | 111 | 107 |
| Conversion | % | 79 | 90 |
| DSC analysis after hardening at 110° C. for 1 h | | | |
| Tg | ° C. | 129 | 127 |
| Conversion | % | 91 | 94 |
| DSC analysis after hardening at 130° C. for 1 h | | | |
| Tg | ° C. | 152 | 144 |
| Conversion | % | 94 | 98 |
| DSC analysis after hardening at 150° C. for 1 h | | | |
| Tg | ° C. | 170 | 154 |
| Conversion | % | 100 | 100 |
| DSC analysis after hardening at 180° C. for 1 h | | | |
| Tg | ° C. | 182 | 154 |
| Conversion | % | 100 | 100 |

As the skilled person can easily see from the examples, 2-(3-(aminomethyl)-3,5,5-trimethylcyclohexyl)propane-1,3-diamine (AM-CPDA) is found to be an excellent hardener component in epoxy resin systems.

2-(3-(Aminomethyl)-3,5,5-trimethylcyclohexyl)propane-1,3-diamine (AM-CPDA, see Example 1) exhibits a much higher glass transition temperature compared to isophoronediamine (IPD, see comparative example). It is thus possible, in applications which require glass transition temperatures in the region of 180° C., to achieve inexpensive and low-viscosity epoxy resin formulations, since it is possible to dispense with the use of special high-viscosity and costly high-Tg epoxy resins.

The invention claimed is:
1. An epoxy resin composition comprising:
A) at least one epoxy compound
and
B) a hardener composition comprising:
B1) from 0.1%-100% by weight of 2-(3-(aminomethyl)-3,5,5-trimethylcyclohexyl)propane-1,3-diamine,
and
B2) from 99.9%-0% by weight of at least one further diamine and/or polyamine,
where the stoichiometric ratio of the epoxy groups of A) and the number of active hydrogen atoms of the functional groups of B) varies from 1:2 to 2:1,
C) optionally from 0.1% to 10% by weight of at least one hardening accelerator,
D) optionally at least one latent hardener,
where the amounts of A)-D) add up to 100% by weight,
E) optionally further additives.
2. An epoxy resin composition consisting of:
A) at least one epoxy compound
and
B) a hardener composition consisting of:
B1) from 0.1%-100% by weight of 2-(3-(aminomethyl)-3,5,5-trimethylcyclohexyl)propane-1,3-diamine,
and
B2) from 99.9%-0% by weight of at least one further diamine and/or polyamine,
where the stoichiometric ratio of the epoxy groups of A) and the number of hydrogen atoms of the functional groups of B) varies from 1:2 to 2:1,
C) optionally from 0.1% to 10% by weight of at least one hardening accelerator,
D) optionally at least one latent hardener,
where the amounts of A)-D) add up to 100% by weight,
E) optionally further additives.
3. The epoxy resin composition according to claim 1, wherein epoxy compounds A) are selected from saturated, unsaturated, aliphatic, cycloaliphatic, aromatic and heterocyclic epoxy compounds, and these may also have hydroxyl groups.
4. The epoxy resin composition according to claim 1, wherein epoxy compounds A) are selected from glycidyl ethers, glycidyl esters, aliphatic epoxides, diglycidyl ethers based on bisphenol A and/or bisphenol F, and glycidyl methacrylates.
5. The epoxy resin composition according to claim 1, wherein epoxy compounds A) are selected from the group comprising epoxy resins based on bisphenol A diglycidyl ether, epoxy resins based on bisphenol F diglycidyl ether, 4,4'-methylenebis[N,N-bis(2,3-epoxypropyl)aniline], hexanediol diglycidyl ether, butanediol diglycidyl ether, trimethylolpropane triglycidyl ether, propane-1,2,3-triol triglycidyl ether, pentaerythritol tetraglycidyl ether, diglycidyl hexahydrophthalate, and aliphatic or cycloaliphatic epoxy resin types.
6. The epoxy resin composition according to claim 1, wherein component B2) comprises the following amines, alone or in mixtures:
aliphatic amines, adipic dihydrazide, hydrazine, or polyalkylenepolyamines selected from ethylene-1,2-diamine, propylene-1,2-diamine, propylene-1,3-diamine, butylene-1,2-diamine, butylene-1,3-diamine, butylene-1,4-diamine, 2-(ethylamino)ethylamine, 3-(methylamino)propylamine, diethylenetriamine, triethylenetetramine, pentaethylenehexamine, trimethylhexamethylenediamine, 2,2,4-trimethylhexamethylenediamine, 2,4,4-trimethylhexamethylenediamine, 2-methylpentanediamine, hexamethylenediamine, N-(2-aminoethyl)ethane-1,2-diamine, N-(3-aminopropyl)propane-1,3-diamine, N,N''-1,2-ethanediylbis(1,3-propanediamine), and dipropylenetriamine;

oxyalkylenepolyamines selected from polyoxypropylenediamine, polyoxypropylenetriamine, 1,13-diamino-4,7,10-trioxatridecane, and 4,7-dioxadecane-1,10-diamine;

cycloaliphatic amines selected from isophoronediamine (3,5,5-trimethyl-3-aminomethylcyclohexylamine), 4,4'-diaminodicyclohexylmethane, 2,4'-diaminodicyclohexylmethane and 2,2'-diaminodicyclohexylmethane, 3,3'-dimethyl-4,4'-diaminodicyclohexylmethane, N-cyclohexyl-1,3-propanediamine, 1,2-diaminocyclohexane, 3-(cyclohexylamino)propylamine, piperazine, N-aminoethylpiperazine, TCD diamine and 4-methylcyclohexane-1,3-diamine;

araliphatic amines or xylylenediamines;

aromatic amines selected from phenylenediamines, phenylene-1,3-diamine, phenylene-1,4-diamine, 4,4'-diaminodiphenylmethane, 2,4'-diaminodiphenylmethane, and 2,2'-diaminodiphenylmethane, adduct hardeners comprising the reaction products of epoxy compounds, comprising glycidyl ethers of bisphenol A and F, with excess amine;

polyamidoamine hardeners obtained by the condensation of mono- and polycarboxylic acids with polyamines or Mannich base hardeners.

7. The epoxy resin composition according to claim 1, wherein di- and/or polyamines B2) are selected from isophoronediamine, 4,4'-diaminodicyclohexylmethane, 2,4'-diaminodicyclohexylmethane, 2,2'-diaminodicyclohexylmethane, a mixture of the isomers of 2,2,4-trimethylhexamethylenediamine and 2,4,4-trimethylhexamethylenediamine, and adduct hardeners based on the reaction products of epoxy compounds and di- and/or polyamines B2) or combination of the aforementioned di- and/or polyamines B2).

8. The epoxy resin composition according to claim 1, wherein di- and/or polyamines B2) are selected from
a) isophoronediamine,
b) a combination of
  1. isophoronediamine and
  2. a mixture of the isomers of 2,2,4-trimethylhexamethylenediamine and 2,4,4-trimethylhexamethylenediamine,
  3. and/or a mixture of the isomers of 4,4'-diaminodicyclohexylmethane, 2,4'-diaminodicyclohexylmethane and 2,2'-diaminodicyclohexylmethane,
c) a combination of
  1. a mixture of the isomers of 2,2,4-trimethylhexamethylenediamine and 2,4,4-trimethylhexamethylenediamine,
  2. and/or a mixture of the isomers of 4,4'-diaminodicyclohexylmethane, 2,4'-diaminodicyclohexylmethane and 2,2'-diaminodicyclohexylmethane,
d) and/or adduct hardeners based on the reaction products of epoxy compounds and the aforementioned amines B2) or combination of the aforementioned amines B2).

9. The epoxy resin composition according to claim 1, wherein hardening accelerators C) present are imidazole and/or imidazole derivatives.

10. The epoxy resin composition according to claim 1, wherein latent hardeners D) are selected from dicyandiamide, cyanoguanidines, aromatic amines, guanidines, modified polyamines, N-acylimidazoles, imidazoles, carbonyl hydrazides, triazine derivatives, melamine and derivatives thereof, N-cyanoacylamide compounds, and acylthiopropylphenols.

11. The epoxy resin composition according to claim 1, comprising from 0.1% to 10% by weight of at least one hardening accelerator compounds.

12. The epoxy resin composition according to claim 11, wherein the hardening accelerators are imidazole and/or imidazole derivatives.

13. The epoxy resin composition according to claim 1, comprising at least one latent hardener.

14. The epoxy resin composition according to claim 13, wherein the at least one latent hardener is selected from dicyandiamide, cyanoguanidines, aromatic amines, guanidines, modified polyamines, N-acylimidazoles, imidazoles, carbonyl hydrazides, triazine derivatives, melamine and derivatives thereof, N-cyanoacylamide compounds, and acylthiopropylphenols.

15. The epoxy resin composition according to claim 3, wherein di- and/or polyamines B2) are selected from isophoronediamine, 4,4'-diaminodicyclohexylmethane, 2,4'-diaminodicyclohexylmethane, 2,2'-diaminodicyclohexylmethane, a mixture of the isomers of 2,2,4-trimethylhexamethylenediamine and 2,4,4-trimethylhexamethylenediamine, and adduct hardeners based on the reaction products of epoxy compounds and di- and/or polyamines B2) or combination of the aforementioned di- and/or polyamines B2).

16. The epoxy resin composition according to claim 4, wherein di- and/or polyamines B2) are selected from isophoronediamine, 4,4'-diaminodicyclohexylmethane, 2,4'-diaminodicyclohexylmethane, 2,2'-diaminodicyclohexylmethane, a mixture of the isomers of 2,2,4-trimethylhexamethylenediamine and 2,4,4-trimethylhexamethylenediamine, and adduct hardeners based on the reaction products of epoxy compounds and di- and/or polyamines B2) or combination of the aforementioned di- and/or polyamines B2).

17. The epoxy resin composition according to claim 3, wherein component B2) comprises the following amines, alone or in mixtures:

aliphatic amines, adipic dihydrazide, hydrazine, or polyalkylenepolyamines, selected from ethylene-1,2-diamine, propylene-1,2-diamine, propylene-1,3-diamine, butylene-1,2-diamine, butylene-1,3-diamine, butylene-1,4-diamine, 2-(ethylamino)ethylamine, 3-(methylamino)propylamine, diethylenetriamine, triethylenetramine, pentaethylenehexamine, trimethylhexamethylenediamine, 2,2,4-trimethylhexamethylenediamine, 2,4,4-trimethylhexamethylenediamine, 2-methylpentanediamine, hexamethylenediamine, N-(2-aminoethyl)ethane-1,2-diamine, N-(3-aminopropyl)propane-1,3-diamine, N,N''-1,2-ethanediylbis(1,3-propanediamine), and dipropylenetriamine;

oxyalkylenepolyamines selected from polyoxypropylenediamine, polyoxypropylenetriamine, 1,13-diamino-4,7,10-trioxatridecane, and 4,7-dioxadecane-1,10-diamine;

cycloaliphatic amines selected from isophoronediamine (3,5,5-trimethyl-3-aminomethylcyclohexylamine), 4,4'-diaminodicyclohexylmethane, 2,4'-diaminodicyclohexylmethane and 2,2'-diaminodicyclohexylmethane, 3,3'-dimethyl-4,4'-diaminodicyclohexylmethane, N-cyclohexyl-1,3-propanediamine, 1,2-diaminocyclohexane, 3-(cyclohexylamino)propylamine, piperazine, N-aminoethylpiperazine, TCD diamine and 4-methyl-cyclohexane-1,3-diamine;

aralipathic amines or xylylenediamines;

aromatic amines selected from phenylenediamines, phenylene-1,3-diamine, phenylene-1,4-diamine, 4,4'-diaminodiphenylmethane, 2,4'-diaminodiphenylmethane, and 2,2'-diaminodiphenylmethane;

adduct hardeners comprising the reaction products of epoxy compounds comprising glycidyl ethers of bisphenol A and F, with excess amine;

polyamidoamine hardeners obtained by the condensation of mono- and polycarboxylic acids with polyamines or Mannich base hardeners.

18. The epoxy resin composition according to claim 4, wherein component B2) comprises the following amines, alone or in mixtures:

aliphatic amines, adipic dihydrazide, hydrazine, or polyalkylenepolyamines selected from ethylene-1,2-diamine, propylene-1,2-diamine, propylene-1,3-diamine, butylene-1,2-diamine, butylene-1,3-diamine, butylene-1,4-diamine, 2-(ethylamino)ethylamine, 3-(methylamino)propylamine, diethylenetriamine, triethylenetetramine, pentaethylenehexamine, trimethylhexamethylenediamine, 2,2,4-trimethylhexamethylenediamine, 2,4,4-trimethylhexamethylenediamine, 2-methylpentanediamine, hexamethylenediamine, N-(2-aminoethyl)ethane-1,2-diamine, N-(3-aminopropyl)propane-1,3-diamine, N,N''-1,2-ethanediylbis(1,3-propanediamine), and dipropylenetriamine;

oxyalkylenepolyamines selected from polyoxypropylenediamine, polyoxypropylenetriamine, 1,13-diamino-4,7,10-trioxatridecane, and 4,7-dioxadecane-1,10-diamine;

cycloaliphatic amines selected from isophoronediamine (3,5,5-trimethyl-3-aminomethylcyclohexylamine), 4,4'-diaminodicyclohexylmethane, 2,4'-diaminodicyclohexylmethane and 2,2'-diaminodicyclohexylmethane, 3,3'-dimethyl-4,4'-diaminodicyclohexylmethane, N-cyclohexyl-1,3-propanediamine, 1,2-diaminocyclohexane, 3-(cyclohexylamino)propylamine, piperazine, N-aminoethylpiperazine, TCD diamine and 4-methyl-cyclohexane-1,3-diamine;

aralipathic amines or xylylenediamines;

aromatic amines selected from phenylenediamines, phenylene-1,3-diamine, phenylene-1,4-diamine, 4,4'-diaminodiphenylmethane, 2,4'-diaminodiphenylmethane, and 2,2'-diaminodiphenylmethane;

adduct hardeners comprising the reaction products of epoxy compounds, comprising glycidyl ethers of bisphenol A and F, with excess amine;

polyamidoamine hardeners obtained by the condensation of mono- and polycarboxylic acids with polyamines, or Mannich base hardeners.

19. The epoxy resin composition according to claim 5, wherein component B2) comprises the following amines, alone or in mixtures:

aliphatic amines, adipic dihydrazide, hydrazine, or polyalkylenepolyamines selected from ethylene-1,2-diamine, propylene-1,2-diamine, propylene-1,3-diamine, butylene-1,2-diamine, butylene-1,3-diamine, butylene-1,4-diamine, 2-(ethylamino)ethylamine, 3-(methylamino)propylamine, diethylenetriamine, triethylenetetramine, pentaethylenehexamine, trimethylhexamethylenediamine, 2,2,4-trimethylhexamethylenediamine, 2,4,4-trimethylhexamethylenediamine, 2-methylpentanediamine, hexamethylenediamine, N-(2-aminoethyl)ethane-1,2-diamine, N-(3-aminopropyl)propane-1,3-diamine, N,N''-1,2-ethanediylbis(1,3-propanediamine), and dipropylenetriamine;

oxyalkylenepolyamines selected from polyoxypropylenediamine, polyoxypropylenetriamine, 1,13-diamino-4,7,10-trioxatridecane, and 4,7-dioxadecane-1,10-diamine;

cycloaliphatic amines selected from isophoronediamine (3,5,5-trimethyl-3-aminomethylcyclohexylamine), 4,4'-diaminodicyclohexylmethane, 2,4'-diaminodicyclohexylmethane and 2,2'-diaminodicyclohexylmethane, 3,3'-dimethyl-4,4'-diaminodicyclohexylmethane, N-cyclohexyl-1,3-propanediamine, 1,2-diaminocyclohexane, 3-(cyclohexylamino)propylamine, piperazine, N-aminoethylpiperazine, TCD diamine and 4-methyl-cyclohexane-1,3-diamine;

aralipathic amines or xylylenediamines;

aromatic amines selected from phenylenediamines, phenylene-1,3-diamine, phenylene-1,4-diamine, 4,4'-diaminodiphenylmethane, 2,4'-diaminodiphenylmethane, and 2,2'-diaminodiphenylmethane;

adduct hardeners comprising the reaction products of epoxy compounds, comprising glycidyl ethers of bisphenol A and F, with excess amine;

polyamidoamine hardeners obtained by the condensation of mono- and polycarboxylic acids with polyamines or Mannich base hardeners.

* * * * *